Dec. 28, 1937.  R. A. LEWIS ET AL  2,103,730
WELDED CAR UNDERFRAME
Filed Dec. 29, 1934   8 Sheets-Sheet 1

Inventors
Roy A. Lewis
and
Charles Schenck.
By R. S. A. Dougherty.
Attorney

Dec. 28, 1937.   R. A. LEWIS ET AL   2,103,730
WELDED CAR UNDERFRAME
Filed Dec. 29, 1934    8 Sheets-Sheet 2
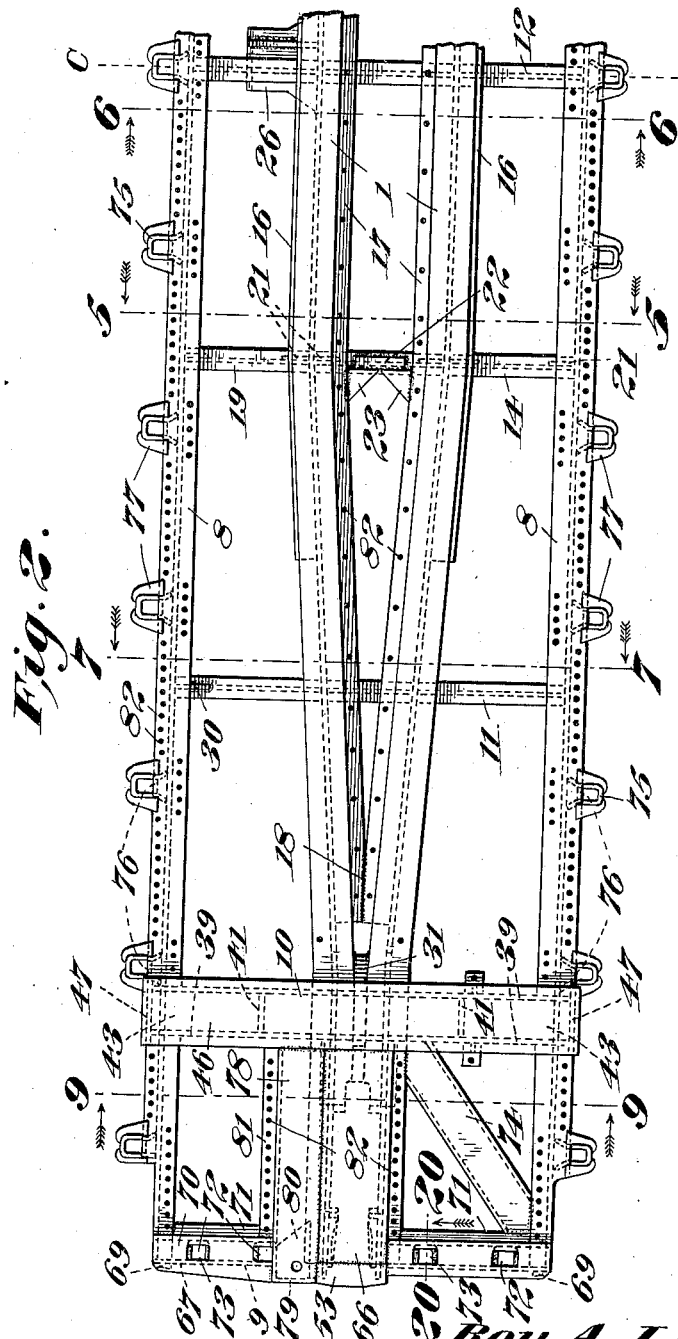
Inventors
Roy A. Lewis and
Charles Schenck.
By R. S. C. Dougherty.
Attorney

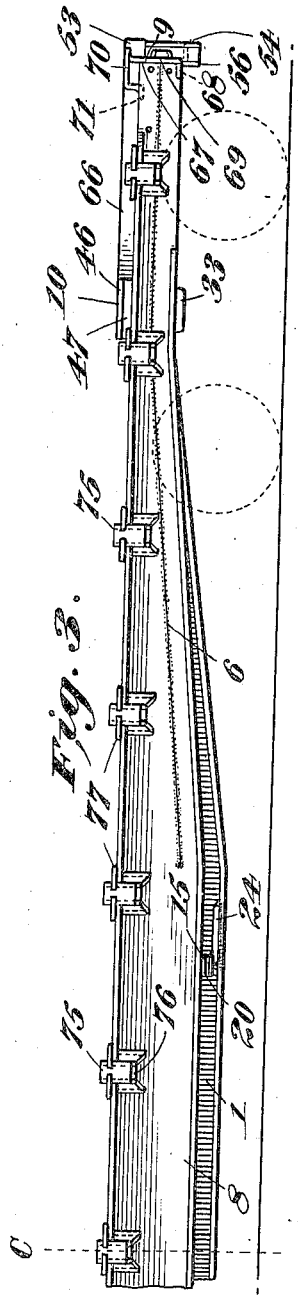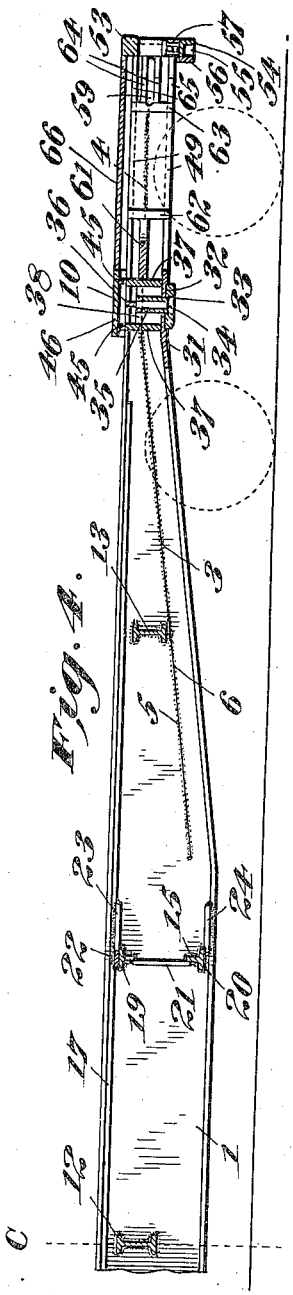

Dec. 28, 1937.  R. A. LEWIS ET AL  2,103,730
WELDED CAR UNDERFRAME
Filed Dec. 29, 1934  8 Sheets-Sheet 4
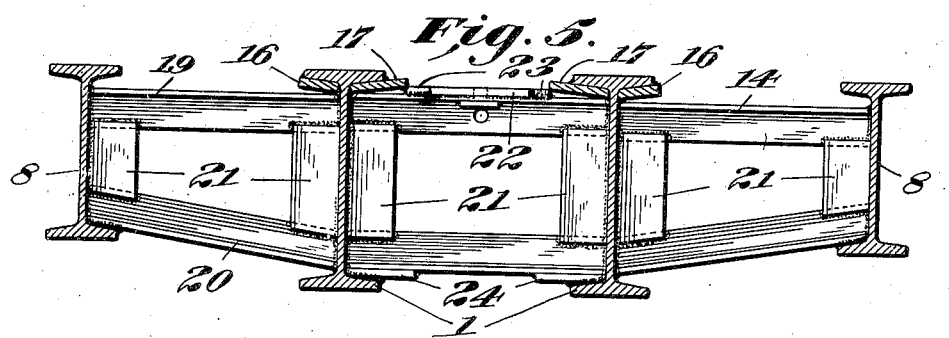
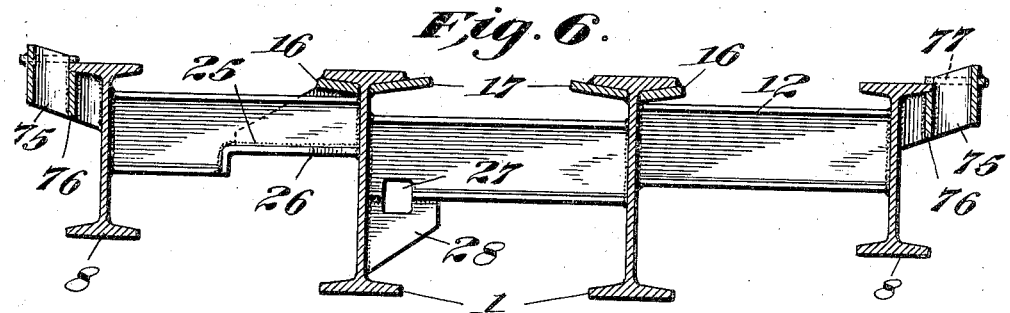
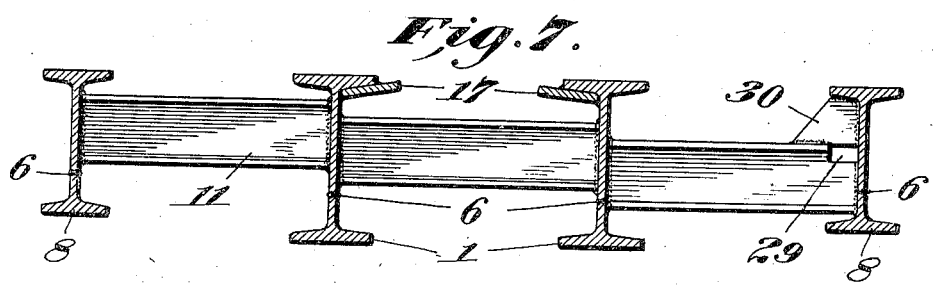
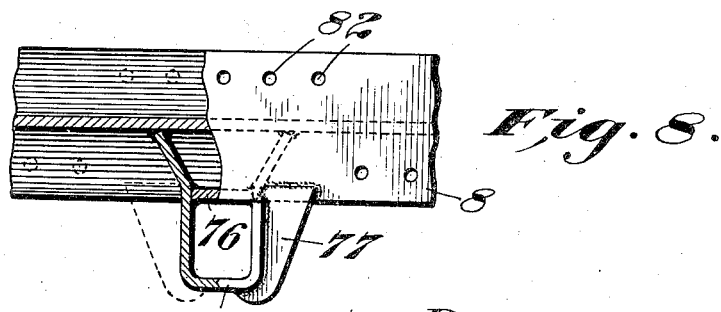
Inventors
Roy A. Lewis and
Charles Schenck.
By R. S. A. Dougherty
Attorney Dec. 28, 1937.    R. A. LEWIS ET AL    2,103,730
WELDED CAR UNDERFRAME
Filed Dec. 29, 1934    8 Sheets-Sheet 5
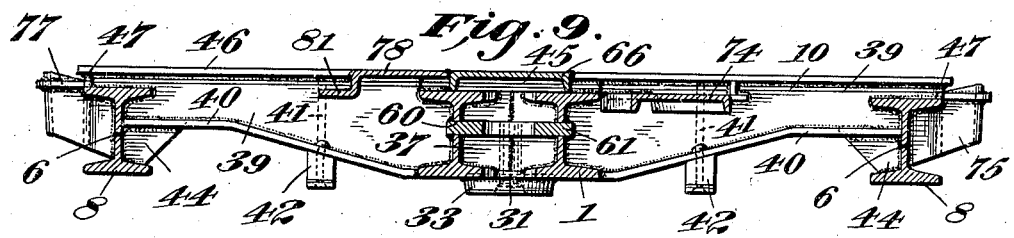
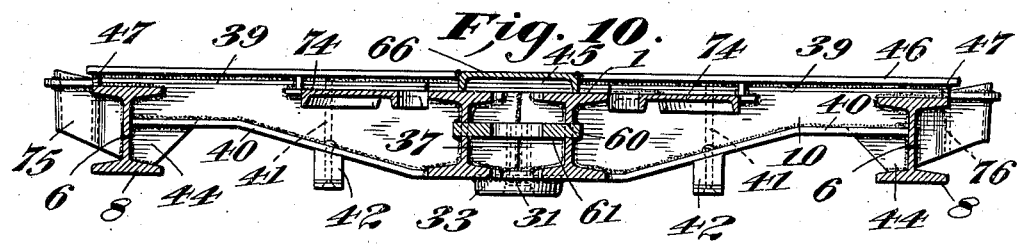
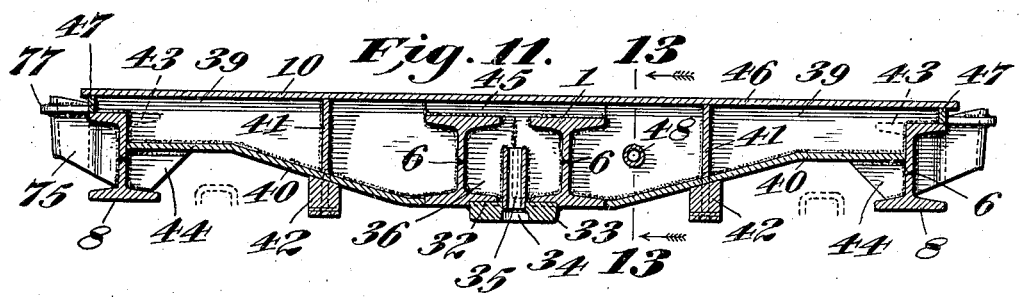
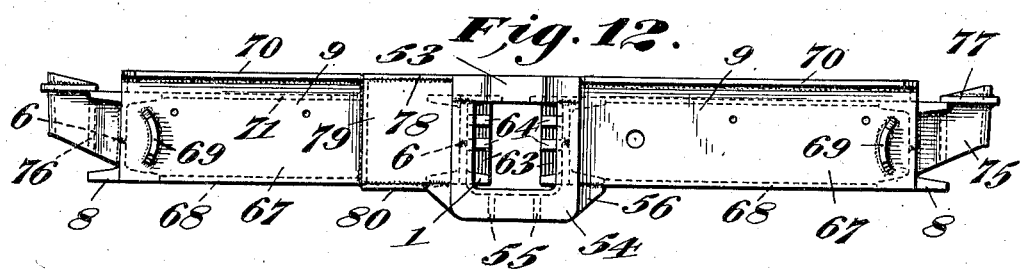
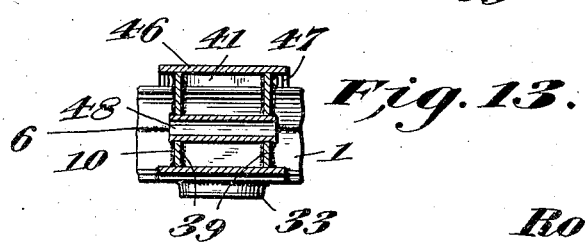
Inventors
Roy A. Lewis and
Charles Schenck.
By R. S. C. Dougherty
Attorney Dec. 28, 1937.  R. A. LEWIS ET AL  2,103,730
WELDED CAR UNDERFRAME
Filed Dec. 29, 1934   8 Sheets-Sheet 6
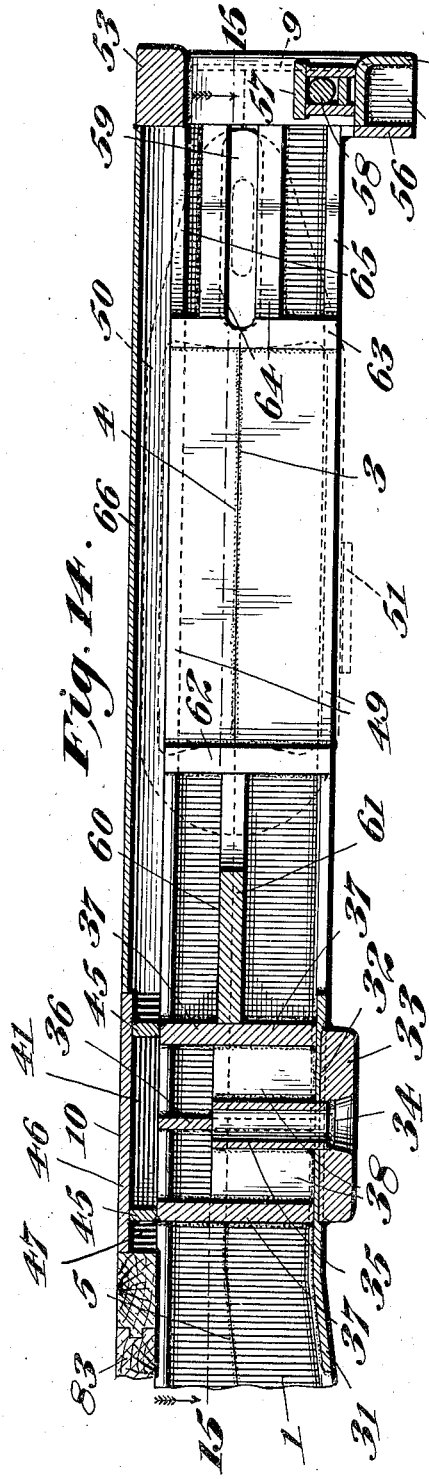
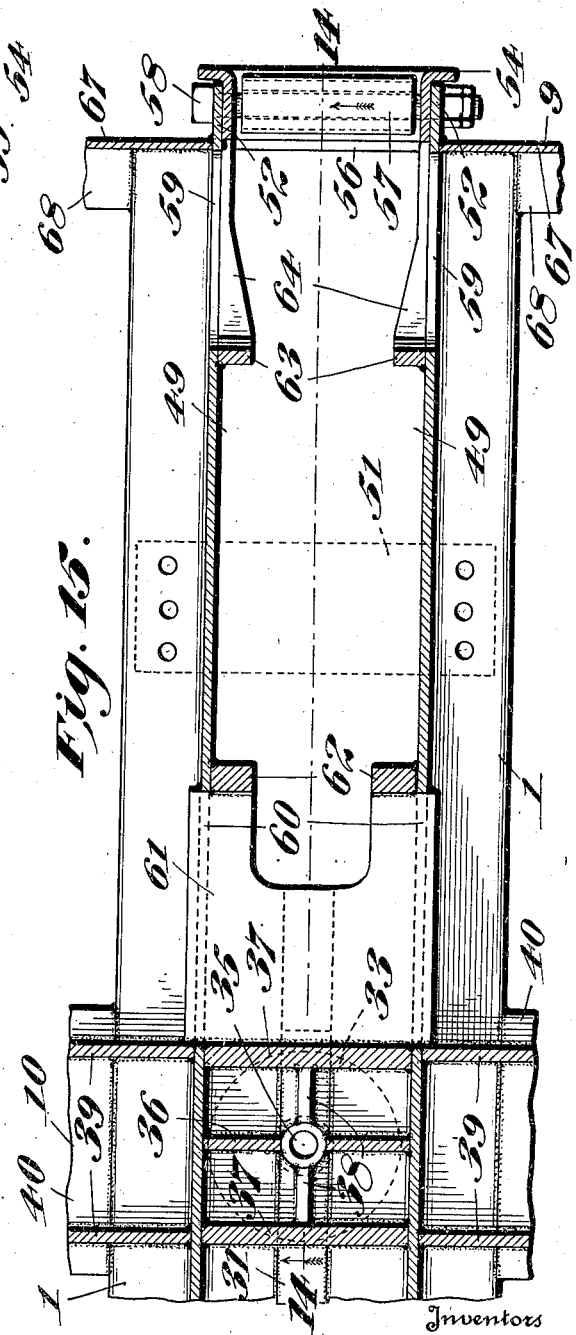
Inventors
Roy A. Lewis and
Charles Schenck
By P. S. C. Dougherty
Attorney

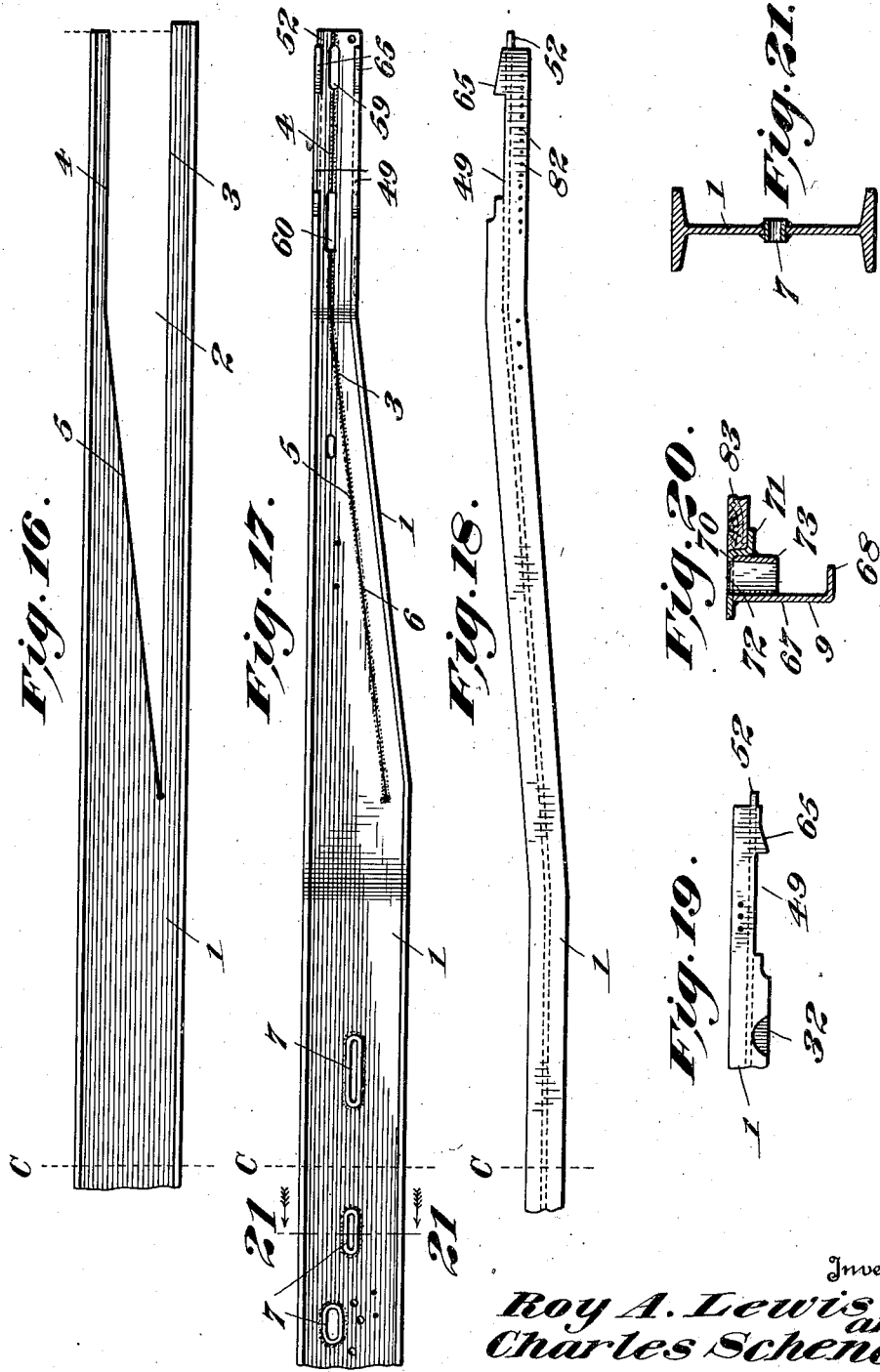

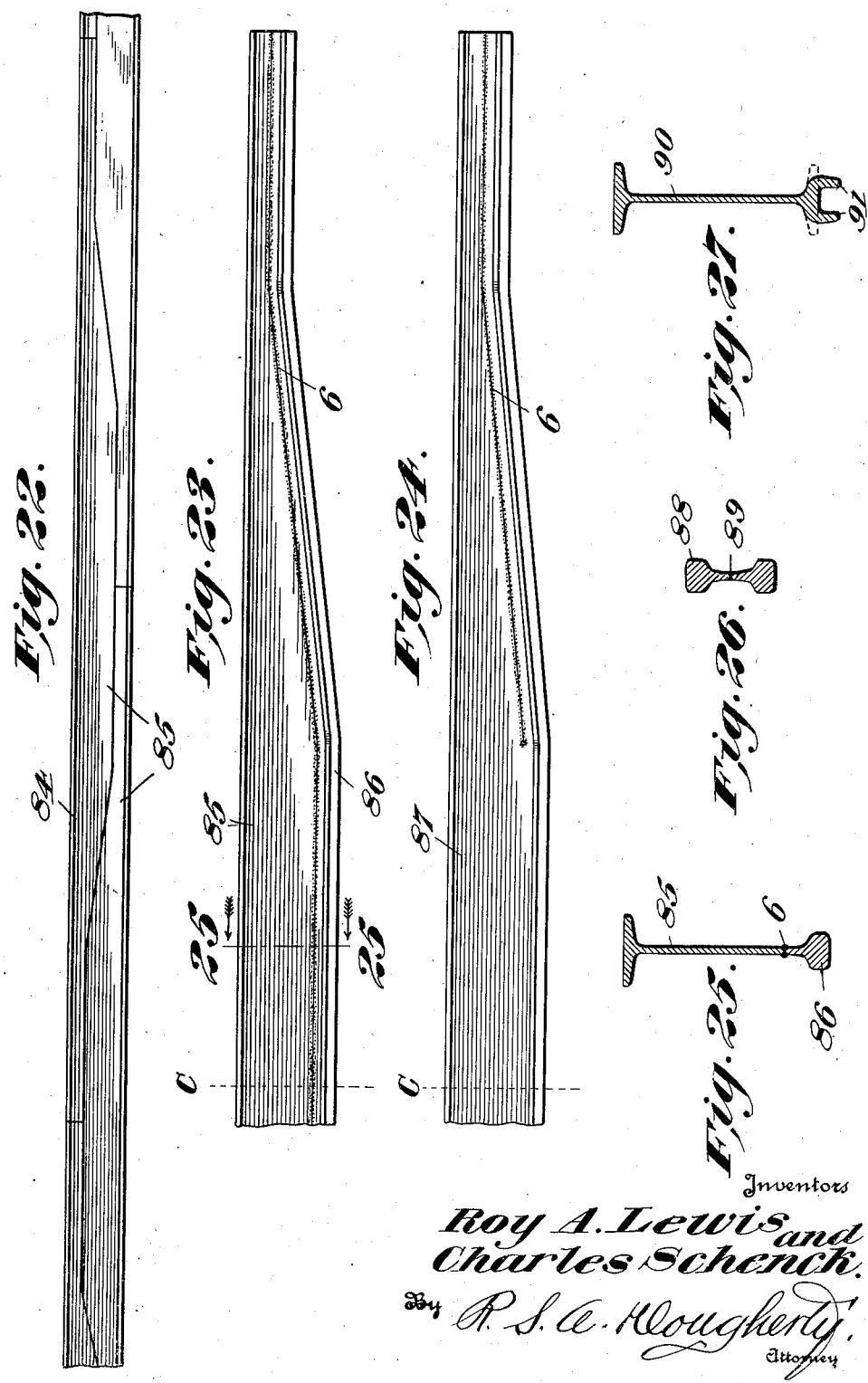

Patented Dec. 28, 1937

2,103,730

UNITED STATES PATENT OFFICE 2,103,730

WELDED CAR UNDERFRAME

Roy A. Lewis, Bethlehem, and Charles Schenck, Coopersburg, Pa., assignors to Bethlehem Steel Company, a corporation of Pennsylvania Application December 29, 1934, Serial No. 759,704

28 Claims. (Cl. 105—414)

This invention relates generally to railway cars and more especially to the underframing for cars of the flat type or the like although it may be adapted for other kinds of cars if desired.

Heretofore in the construction of steel cars from rolled structural material the parts have usually been connected together by means of rivets or the like. It has been found that the riveted connections of cars built in this manner soon rust out on account of moisture and corrosive atmospheric conditions.

In order to obviate this difficulty in the present invention rivets are dispensed with and all of the parts used in constructing the underframe are welded together to form a single integral member.

One of the objects of this invention is to produce a car underframe entirely of rolled plate and flanged metal sections which are cut and formed in the desired shape and the parts then integrally secured together by welding to form a unitary structure, thereby dispensing with the use of rivets or bolts.

Another object of the invention consists in so arranging and fabricating the underframe that the distribution of the material entering into its construction will function as a unit to resist draft, buffing, and load stresses, thereby a maximum strength may be obtained with a minimum number of parts and a corresponding saving in weight.

Another object of the invention is to form the center and side sills for the underframe of rolled flanged sections with reduced end portions which are substantially solid or integral throughout their length, the central portions of the I-beams forming the center sill being spaced apart laterally a greater distance than the end portions to form a more efficient support for the car floor at this point.

Another object of the invention relates to the manner of forming the body bolsters of box construction in such a manner that the interior surfaces of the bolster will be sealed and not exposed to moisture and corrosive atmospheric conditions.

Another object of the invention relates to the manner of constructing the draft end portions of the center sill and the abutment stops and backings for the same attached thereto for engaging the draft rigging.

A further object of the invention relates to the construction and means by which the stake pockets are attached to the car underframe.

Other objects will appear hereafter.

The invention comprises details of arrangement and the combination of parts hereinafter more fully described in the specification and illustrated in the drawings, and claimed in the appended claims.

Referring now to the accompanying eight sheets of drawings which form a part of this specification and on which like characters of reference indicate like parts:—

Fig. 2 is a top plan view similar to Fig. 1 but showing the other half of the car underframe.

Fig. 3 is a side elevation of the half of the car shown in Fig. 1.

Fig. 4 is a longitudinal section taken on the line 4—4 of Fig. 1.

Fig. 5 is a transverse section taken on the line 5—5 of Fig. 2.

Fig. 6 is a transverse section taken on the line 6—6 of Fig. 2.

Fig. 7 is a transverse section taken on the line 7—7 of Fig. 2.

Fig. 8 is a detail view of one of the side stakes with parts broken away to more clearly illustrate its construction and the manner of attaching it to the side sill.

Fig. 9 is a transverse section taken on the line 9—9 of Fig. 2.

Fig. 10 is a transverse section taken on the line 10—10 of Fig. 1.

Fig. 11 is a vertical section taken transversely of the car through the center of one of the body bolsters on the line 11—11 of Fig. 1.

Fig. 12 is an elevation of one end of the car underframe.

Fig. 13 is a transverse section of the body bolster taken on the line 13—13 of Fig. 11.

Fig. 14 is a central vertical longitudinal section of one of the draft end portions of the center sill of the car underframe drawn on a larger scale, taken on the line 14—14 of Fig. 15.

Fig. 15 is a horizontal section of the central end portion of the car underframe taken on the line 15—15 of Fig. 14.

Fig. 16 illustrates the manner of cutting out the intermediate portions of the ends of a flanged shape in forming the center and side sills of the car underframe.

Fig. 17 is a side elevation of a little more than half of one of the I-beams used in forming the center sill.

Fig. 18 is a top plan view of the end portion of the center sill I-beam illustrated in Fig. 17.

Fig. 19 is a bottom plan view of the draft end portion of one of the center sill I-beams illustrated in Figs. 17 and 18.

Fig. 20 is a transverse sectional view through one of the end sills and one of the end stake pockets, taken on the line 20—20 of Fig. 2.

Fig. 21 is a transverse section through one of the center sill I-beams taken on the line 21—21 of Fig. 17.

Fig. 22 illustrates the manner in which a flanged shape may be cut out in constructing a modified form of a center or side sill.

Fig. 23 is a side elevation of one-half of a modified form of I-beam which can be used for the center and side sills in which the bottom chord of the sill is formed of a separate shape of different form than that of the top chord, the two members being welded together the full length of the beam.

Fig. 24 is a side elevation of a sill constructed in the manner shown in Fig. 17, but made from a specially rolled shape with the bottom chord of the sill of similar shape and cross-sectional area to that shown in Fig. 23.

Fig. 25 is a vertical transverse section taken on the line 25—25 of Fig. 23, but drawn on a larger scale.

Fig. 26 is a transverse section of a bar used in forming the bottom chord member shown in Fig. 23 and illustrating the manner of cutting the bar in half in forming the same and Fig. 27 illustrates another modified form of flanged section in which a standard I-beam having a pair of its flanges bent downwardly after rolling is used.

Figure 1:
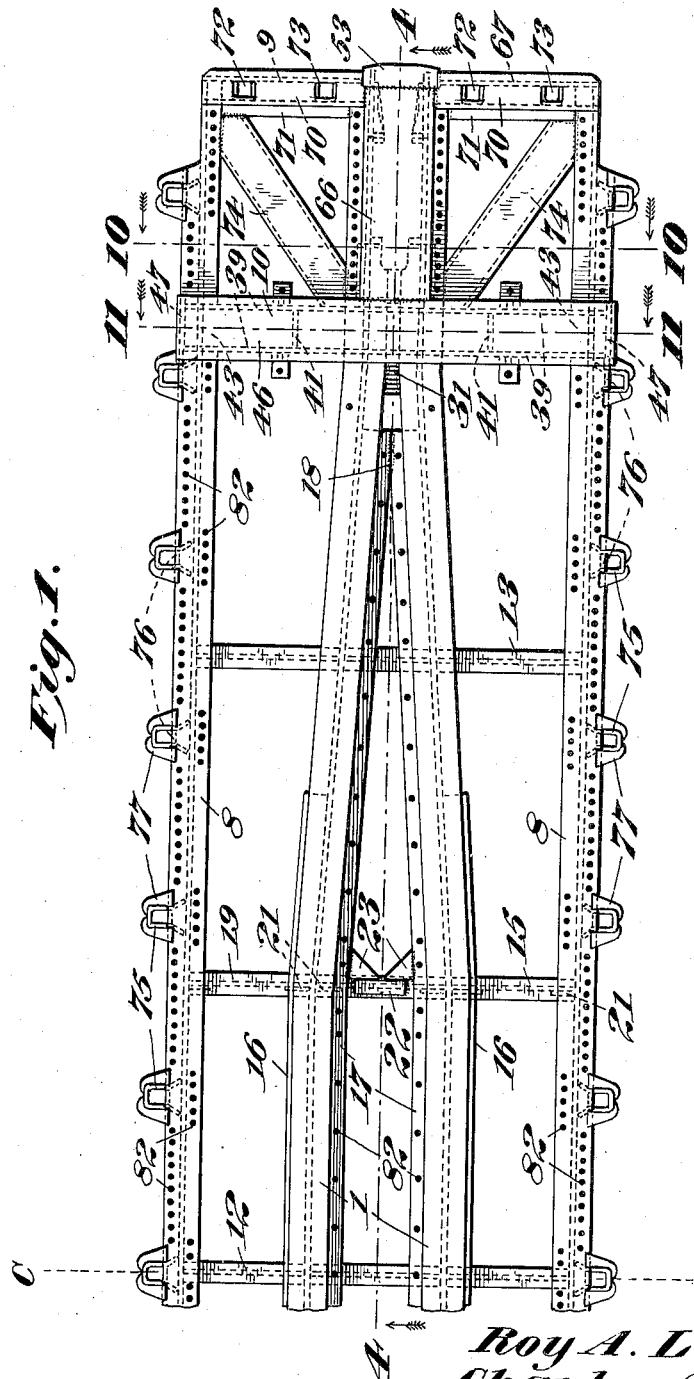
Figure 1 is a top plan view of slightly more than one-half of the car underframe for cars embodying our invention.

Referring now to the various characters of reference on the drawings in which the center of the car is indicated at C, and first to Figs. 1 to 21 inclusive:—

The center sill of the underframe which is indicated at 1 is formed of two rolled metal I-beams extending the full length of the car. The intermediate web portions of the ends of each I-beam in forming the center sill are sheared out as indicated at 2 in Fig. 16, thereby forming bifurcated ends. The upper edges 3 of the lower cut surfaces of the bifurcated end portions being parallel throughout their lengths with the top and bottom flanges of the I-beam, while the ends 4 of top edge of the cuts extend parallel with the edge 3 for a portion of their lengths and then downwardly and inwardly inclined to the edge 3 as indicated at 5 thus forming quadrilateral shaped openings with a tapered or inclined inner side. The openings 2 are then closed by bending up the portions of the web and flanges below the openings formed by the sheared out portions until the edges 3, 4, and 5 are in engagement with each other, the sheared edges are then welded together as indicated at 6.

In bending up the lower portions of the ends of the I-beam it is necessary to have the upper end portion somewhat shorter then the lower portion as indicated in Fig. 16.

As the center sill is provided with slots for receiving the brake levers or the like these openings or slots are reinforced by means of sleeves 7 which are welded to the sides of the webs of the I-beams.

In forming a sill in this manner the height at the ends are reduced thereby forming a sill of the fish-bellied type of rolled flanged section which is substantially integral and unbroken throughout its length including the reduced end portions. 8 indicates the side sills which are also formed of I-beams but preferably of smaller cross-sectional area, each having a portion of the web at the ends sheared out and the bottom end portions bent up and welded together as at 6 in a similar manner as in forming the center sill.

The center sill 1 and side sills 8 are integrally connected together by means of end sills 9, body bolsters 10, cross-ties 11, 12, and 13, and cross-bearers 14 and 15.

The reduced ends of the two center sill I-beam members between the body bolsters 10 and the end sills 9 act as the draft-sills and are spaced nearer together than the central portions between the cross-bearers 14 and 15, at which point the center sill members are spaced substantially the same distance apart from each other as the spaces between the center sill members and the side sills, and are inclined outwardly and inwardly from the body bolsters to the cross-bearers.

The top flanges of the center sill between the body bolsters are reinforced by means of outwardly extending plates 16 and inwardly extending plates 17 which are welded to the top flanges of the center sill, the inner ends of the plates 17 being welded together as at 18. The plates 17 not only reinforce the center sill members but have bolt holes formed therein for receiving bolts for securing the wooden flooring thereto.

The cross-bearers 14 and 15 at intermediate points between the cross-ties are of considerable depth having top and bottom chord members 19 and 20 respectively of T-shape having connecting plates 21 for securing the ends together which are welded to the top and bottom chord members 19 and 20 and to the webs of the center and side sills, as clearly indicated in Fig. 5. The central portion of the top chord 19 between the center sill members is further reinforced by means of a short cover plate 22 and at the ends by means of gusset plates 23 which are welded to the top chord and the edges of reinforcing plates 17, while the lower chord member 20 between the center sill members is reinforced at the ends by means of gusset plates 24 welded to the bottom chord and the inwardly extending flanges of the center sill.

The cross-ties which space and connect the center and side sills are formed of I-bars having their ends welded to the center and side sills. The parts of the cross-ties between the center sill members are disposed in staggered relation with the parts extending from the center to the side sills.

The central cross-tie 12 has one of its tie members between the center and side sill cut out as at 25 to receive a brake cylinder support 26 which is welded thereto while the central portion of the said cross-tie member is cut out as at 27 for the passage of a brake-rod or air line pipe and is reinforced by means of a notched gusset plate 28 which is welded to the bottom of the cross-tie and the web of the center sill.

Cross-ties 11 and 13 are made of I-bars similar to cross-tie 12 with one end of the top portion of the cross-tie 11 cut out as at 29 for the passage of a brake-rod and reinforced by means of a gusset plate 30.

The body bolsters 10 are each similarly constructed and a description of one will apply to both. At this point the lower flanges of the center sill members are connected together by means of a separator 31, which has its edges welded thereto, after this is done a recess or socket 32 is milled out in the lower surface of the center sill for the reception of a center plate 33 which is provided with a central opening 34 adapted to receive a king-bolt pocket 35 for the king-bolt. Extending radially of the king-bolt pocket 35 and welded thereto and to the center sill is a central reinforcing brace 36. This brace is formed of two plate members of similar shape which are welded together over the central opening 34. Spaced apart a short distance from each side of the brace 36 are center sill separators 37 each being formed of two plate members somewhat thicker than the brace 36 which are welded together centrally and to the center sill. The king-bolt pocket 35, and center sill separators 31 and 37 are further reinforced by means of center brace ribs 38 which are welded thereto.

Arranged in pairs and outwardly extending from each side of the center sill in alignment with the separators 37 are bolster web plates 39. Each pair of web plates 39 are provided with a bottom cover plate 40 welded to their bottom edges, and each pair of said web plates are also connected together at an intermediate point by means of a side bearing brace 41 located above the side bearings 42. The outer ends of each pair of web plates 39 and bottom cover plates 40 extend to the side sills and are welded thereto. A portion of the inner flange of each side sill is cut away at this point as at 43 and gusset plates 44 preferably extending into slots formed in the ends of the bottom cover plate 40 in alignment with the web plates 39 are welded to the bottom cover plates and the side sills to further reinforce the ends of the body bolster. The body bolster web plates extend slightly above the center and side sills and are provided over the center sill with filler plates 45 for supporting the top body bolster cover plate 46 which extends the full length of the bolster and is supported at its outer ends over the side sills by means of filler plates 47. All of the parts of the body bolster are formed of rolled plates and welded together to form an integral structure having its hollow inner surfaces sealed against atmospheric corrosive action. Where openings are required through the webs of the bolsters for the passage of brake lever rods or pipes, a pipe ferrule 48 is used having its outer ends welded to the bolster web plates 39 as indicated in Figs. 11 and 13. One or more of these pipe ferrules can be used and the size may vary as required.

The draft end portions of the center sill between the end sills 9 and the body bolsters 10, at each end of the car underframe have their inner flanges cut away as at 49 for receiving the draft gear 50 which is held in position by means of a draft gear carrier 51 indicated in dotted lines in Fig. 14. The flanges of the extreme ends of the center sill are cut away to allow the webs to project as at 52 to which is attached the striking blocks 53 and strikers 54, said strikers having reinforcing ribs 55 and bottom backing plates 56. The strikers 54 are adapted to support the coupler carriers 57, each of which is retained in position by means of a bolt 58 which passes through the webs of the center sill.

Slots 59 and 60 are formed in the draft ends of the center sill for receiving the draft-keys for the draft rigging and backing ribs 61 for the back-stops 62. These back stops 62 are welded to the inner cut end flanges and webs of the center sill and the backing ribs, while the front-stops 63 for the draft gear are welded to the cut inner end flanges and webs of the center sill and are further reinforced by means of braces 64 on each side of the key slots 59. The inner flanges of the center sills being beveled as at 65 between the front stops 63 and the end sills 9. As indicated more clearly in Figs. 1, 9, and 10 the draft ends of the center sill are provided with covers 66 of channel shape disposed with their flanges extending downwardly and welded to the sill, these covers 66 extending from the body bolsters 10 to the striking blocks 53 with their top surfaces all on the same horizontal plane.

The end sills 9 are constructed of rolled plate metal and formed in two parts each extending from the center to the side sills, having a vertical web portion 67 with an inwardly extending bottom flange 68 and provided with a crescent shaped push pole pocket 69 secured thereto near the outer ends by welding.

A cover plate 70 is welded to the top edges of each web portion 67 of the end sills. These cover plates 70 extend rearwardly a short distance and have their inner ends bent at right angles and then flanged as at 71, the top portion of the flange being in the same horizontal plane as the tops of the center and side sills for supporting a portion of the car floor thereon. The end sill cover plates 70 are perforated at intermediate points as at 72 for receiving the upper ends of U-shaped end stake pockets 73 which are welded thereto, with the ends of the legs welded to the inner face of the web plate 67.

The ends of the car underframe are further reinforced by means of diagonal braces 74 having the edges of one end welded to the inner flanges of the side sills and flange 71 of the end sill cover plate 70 and the opposite end welded to the outer flange of the center sill and the body bolster web plate 39.

Side stake pockets 75 of U-shaped having the ends of their legs outwardly inclined are secured by welding to the side sills at spaced intervals and are each further reinforced by a rib 76 connecting the legs together and brackets 77 welded to each side of the pockets.

The end of the car underframe for supporting the brake-mast is constructed somewhat different from that of the opposite end.

In this case one of the diagonal braces 74 at one side of the car end is dispensed with and a plate 78 is used adapted to support the hand-brake-mast and a portion of the car floor. The top of this plate is on a plane with the top surfaces of the cover plate 46 of the body bolster and the channel cover 66 for the draft portion of the center sill and is welded thereto at the inner edges, with the outer end to an end and center sill connecting plate 79 which is reinforced at its bottom edge by means of a gusset plate 80. Plate 78 extends laterally a short distance towards the car side and is then bent at right angles and flanged as at 81 to support a portion of the car floor.

The reinforcing plates 17, flange 81 and the top flanges of the center and side sills have a plurality of bolt holes 82 formed therein for receiving bolts for securing a wooden flooring 83 thereto, but it will be understood that a metal flooring could be used instead of wood if desired.

The top of the flooring is in the same horizontal plane as the tops of the body bolsters, cover plates 78, and end sill and draft sill cover plates 70 and 66 respectively.

Referring now to Figs. 22 to 27 inclusive, Fig. 22 illustrates in elevation a flanged beam 84 indicating how it can be cut in forming the parts 85 of a modified form of car sill.

Fig. 23 shows how one of the parts 85 with a reinforcing bar 86 of a different cross sectional area welded thereto along its entire lower edge may be applied in forming a modified form of car sill.

Fig. 24 shows a special rolled flanged beam 87 which is of similar shape to the beam illustrated in Figs. 23 and 25, but being formed by shearing out a portion of the web and then welding the bifurcated ends together in the manner described for Figs. 16 and 17.

In Fig. 26 a special shaped bar 88 is shown which is adapted to have its web cut centrally as at 89 and then welded to the lower edge of the part 85 in forming the sill shown in Fig. 23, and Fig. 27 illustrates another manner of forming a center sill blank by using a standard rolled I-beam 90 and then bending down the lower flanges as at 91 before it has the ends of the webs sheared out in forming a sill in a similar manner to those illustrated in Figs. 17 and 24.

Although we have shown and described our invention in considerable detail, we do not wish to be limited to the exact construction shown and described, but may use such substitutions, modifications or equivalents thereof, as are embraced within the scope of our invention, or as pointed out in the claims.

We claim:

1. A car underframe, a center sill comprising a pair of rolled flanged sections, side sills integrally connected to the center sill by means of end sills, body bolsters and cross-ties, a socket formed in the lower surface of the center sill at the center of each body bolster, and a center plate seated in each socket and welded to the pair of rolled flanged sections forming the center sill.

2. A car underframe, a center sill comprising a pair of rolled flanged sections having ends of less depth than the central portions, side sills integrally connected to the center sill by means of end sills, body bolsters and cross-ties, cross-bearers at intermediate points between the cross-ties integrally connected to the center and side sills, a separator integrally connecting the lower flanges of the center sill at each body bolster, a socket formed in the lower surface of the center sill at each body bolster, a center plate seated in each socket and welded to the pair of rolled flanged sections forming the center sill, and diagonal braces integrally connected to the center and side sills.

3. A car underframe formed of rolled metal sections welded together and adapted to form an integral structure, comprising center and side sills integrally connected together by means of end sills, cross-ties, and cross-bearers, body bolsters each having a pair of center sill separators, a bolster web plate extending above the center and side sills and in alignment with each center sill separator integrally connecting the center and side sills, filler plates extending above the center sill separators and secured thereto and connecting the bolster plates, a bottom cover plate on each side of the center sill welded to the bottom edges of each pair of bolster web plates between the center and side sills, and to top cover plate extending over the center and side sills and welded to the top edges of the web plates.

4. A car underframe comprising a center sill formed of a pair of rolled flanged beams of the fish-bellied type extending the full length of the car, side sills integrally connected to the center sill by means of end sills, body bolsters each having a pair of center sill separators, a bolster web plate extending above the center and side sills and in alignment with each center sill separator and integrally connecting the center and side sill, a bottom cover plate on each side of the center sill welded to the bottom edges of each pair of bolster web plates and the flanged edges of the center and side sills, a top cover plate extending over the center and side sills and welded to the top edges of the bolster web plates, and a pipe ferrule extending through the bolster having its outer ends welded to the bolster web plates.

5. A car underframe comprising center and side sills integrally connected together by means of end sills, body bolsters each having a pair of center sill separators, spaced bolster web plates extending above the center and side sills in alignment with each center sill separator and integrally connecting the center and side sills, a bottom cover plate on each side of the center sill integrally connecting the bottom edges of each pair of bolster web plates and the center and side sills, filler plates extending over the center sill and welded thereto for connecting the inner ends of the bolster web plates, a filler plate over each side sill and welded thereto for connecting each pair of bolster web plates, and a top cover plate extending over the center and side sills and welded to the top edges of the bolster web plates and the filler plates.

6. A car underframe comprising center and side sills formed of rolled I-beams having reduced end portions, reinforcing plates secured by welding to the underside of the top flanges of the center sills at intermediate points and bolt holes extending through the reinforcing plates adapted to receive bolts for attaching the flooring thereto.

7. A car underframe comprising center and side sills formed of rolled flanged beams extending the full length of the car underframe, end sills and body bolsters integrally connecting the center and side sills, said center sill formed with draft sill portions between the body bolsters and the end sills, back stops welded to the draft portions of the center sill and a backing rib extending through the webs of the draft ends of the center sill and welded thereto, and integrally connected to the back stops and the bolsters.

8. A car underframe having a center sill comprising a pair of rolled I-beams, side sills integrally connected to the center sill by means of end sills body bolsters and cross-ties, draft ends for said center sill between the body bolsters and the end sills each inner flange of the draft sill ends at an intermediate point being cut away to admit the draft gear, back stops for the draft gear welded to the draft ends of the center sill, a backing rib extending through the webs of each of the ends of the center sill and integrally connected to the back stops and the body bolster, and front stops provided with braces welded to the draft ends of the center sill in spaced relation with the back stops.

9. A car underframe having a center sill extending the full length of the car underframe, comprising a pair of rolled I-beams having reduced end portions, side sills integrally connected to the center sill by means of end sills, body bolsters and cross-ties, draft ends for said center sills between the body bolsters and the end sills, each intermediate portion of the inwardly extending flanges of the draft sill ends being cut away to admit the draft gear, back stops for the draft gear welded to the draft ends of the center sill, a backing rib extending through the webs of the draft ends of the center sill and integrally connected to the back stops and the body bolsters, front stops provided with braces welded to the draft ends of the center sill in spaced relation with the back stops, a striking block and striker integrally connecting each end of the pair of rolled I-beams forming the center sill, and reinforcing ribs and a bottom backing plate welded to each of the strikers.

10. A car underframe comprising a pair of spaced I-beams forming a center sill extending the full length of the car, a striker block welded to the top of each end of the center sill of the car, side sills, body bolsters and cross-ties integrally connected to the center sill, a channel shaped cover over each end of the center sill between the body bolsters and the end sills and disposed with their flanges downwardly and welded thereto and their opposite ends welded to the body bolsters and striker blocks, the upper surfaces of said channel shaped covers being on a plane with the tops of the body bolsters and striker blocks, a hand brake and floor supporting plate edge welded to one of the bolsters and channel covers, and means for connecting the outer end of the hand brake and floor supporting plate to the center and end sill.

11. A car underframe comprising center and side sills formed of rolled flanged beams having reduced end portions, said reduced end portions having their webs integrally connected together, end sills welded thereto for integrally connecting the ends of the center and side sills, and cross-ties each formed of a plurality of rolled I-bars arranged in staggered relation to each other in a vertical plane having their ends integrally connected by welding to the webs of the center and side sills at intermediate points between their top and bottom flanges.

12. A car underframe comprising center and side sills each formed of a rolled I-beam each having an intermediate portion of the web at the ends of the I-beams sheared out and the ends bent together and the sheared edges welded together, means welded thereto for integrally connecting the center and side sills and reinforcing plates adapted to form floor attaching means between the bolsters integrally attached to the undersides of the intermediate portions of the top flanges of the center sill.

13. A car underframe comprising a pair of spaced I-beams of rolled section forming a center sill extending the full length of the car, side sills, body bolsters extending above the center sill, and cross-ties secured to the center and side sills by welding, and a channel cover of rolled section over each end of the center sill between each bolster portion extending above the center sill and the end sills and welded thereto adapted to form the car floor over the draft ends of the center sill and disposed with its flanges downwardly and welded to the tops of the center sill beams.

14. A car underframe comprising center and side sills formed of rolled metal beams having reduced end portions, each of said rolled metal beams having their reduced end portions integrally connected together, a flange extending laterally thereof on opposite sides of the web along the top and bottom edges of the center and side sills, and end sills, body bolsters and cross-ties formed of rolled metal sections connecting the center and side sills and welded thereto, cross-bearers at intermediate points between the cross-ties each comprising T-shaped top and bottom chord members having their ends welded to the center and side sills, and connecting plates welded to the ends of the top and bottom chord members of the cross-bearers and the webs of the center and side sills.

15. A car underframe comprising center and side sills formed of rolled flanged sections having their ends reduced in height by shearing out the intermediate portion of the web at the ends of the sections, said ends of the sills adapted to be bent together and butt welded, each of said rolled flanged sections having a vertical web with a flange extending laterally thereof on opposite sides of the web along the top and bottom edges, end sills, body bolsters and cross-ties formed of rolled metal connecting the center and side sills and welded thereto, cross-bearers at intermediate points between the cross-ties each comprising a plurality of spaced T-shaped top and bottom chord members having their legs disposed toward each other with their ends welded to the center and side sills, and connecting plates welded to the ends of the legs of the top and bottom chord members of the cross-bearers and the webs of the center and side sills.

16. A car underframe comprising center and side sills of the fish bellied type formed of rolled I-beams having the webs of their reduced end portions integrally connected together, a plate having a vertical web and an inwardly extending flanged lower edge on each side of the center sill welded to the center and side sills adapted to form the end sill for the car underframe, a cover plate welded to the top edge of the vertical web of each end sill plate and extending inwardly therefrom with a flanged inner edge, and body bolsters, cross-ties and cross-bearers formed of rolled sections connected to the center and side sills by welding adapted to form an integral structure.

17. A car underframe comprising center and side sills having reduced end portions formed of rolled I-beams extending the full length of the car, said reduced end portions having their webs integrally connected together, end sills welded thereto integrally connecting the ends of the center and side sills on opposite sides of the center sill, bolsters extending above the center and side sills formed of plate sections and welded together connecting the center and side sills, gusset plates beneath the outer ends of the bolster each having a welded connection with the ends of the bolsters and the web and lower flange of the side sill, and a plurality of cross-ties and cross-bearers each formed of a plurality of rolled flanged sections secured by welding to the center and side sills in vertical spaced relation with the top flanges integrally connecting the webs of said center and side sills together at intermediate points between the bolsters.

18. A car underframe, a center sill comprising a pair of rolled flanged beams and side sills of similar rolled section each having an intermediate portion of the ends of its web sheared out and the ends bent together and butt welded at the sheared edges, a striking block and a striker for connecting each end of the pair of rolled flanged beams forming the center sills, bolsters and end sills connecting the center and side sills, and a horizontally disposed draft rigging backing rib between each bolster and each end sill having its inner end welded to the bolster and its opposite ends extending through the webs of the center sills and welded thereto.

19. A center sill of the fish bellied type comprising a pair of rolled flanged shapes arranged parallel with each other having draft sill end portions formed integral therewith, each flanged shape having a portion of the ends of its web sheared out and the ends bent together and butt welded at the sheared edges, a striker and a striking block connecting the pair of rolled flanged shapes and welded to each of the ends of the center sill, a horizontally disposed draft rigging backing rib having its opposite ends extending through the webs of each draft sill portion and welded thereto, and vertically arranged front and back draft rigging stops welded to the draft sill portion between each backing rib and the ends of the center sill.

20. A car underframe having a center sill extending the full length of the car underframe, comprising a pair of rolled I-beams having central and reduced end portions of uniform depth and spaced apart a greater distance at the central portion than at their ends, means welded thereto at intermediate points for integrally connecting the two I-beams together to prevent the I-beams from spreading, a striking block welded to each end of the center sill, a striker having a laterally flanged edge welded to each end of the center sill beneath each striking block, a bottom backing plate for each striker, and reinforcing ribs connecting each of the strikers with the bottom back plates.

21. A car sill of the fish bellied type formed of a pair of rolled bars, one of said bars having an integral rolled flanged edge and a web with straight cut central and end edge portions each extending parallel in uniform spaced relation with the rolled flanged edge, inclined cut edges connecting the straight cut central and end portions of the web, said web portion being deeper in the center than at the ends, and the other rolled flanged bar being of uniform cross sectional area throughout its length having a web with its edge continuously butt welded to the cut edge of the web portion of the first mentioned rolled bar.

22. A car sill of rolled metal of the fish bellied type formed of a pair of rolled T-bars, one of said T-bars having a rolled flanged edge and a web with straight cut central and end edge portions each extending parallel in uniform spaced relation with the rolled flanged edge, inclined cut edges connecting the straight cut central and end portions of the web, said web portion being deeper in the central portion than at the ends, and another T-bar of uniform depth having a flanged edge of a different cross sectional area, and a web portion adapted to be continuously butt welded to the cut edge of the first mentioned T-bar.

23. A sill of the fish bellied type for railway cars comprising a rolled bar having a flanged edge and an extending web deeper in the center than at the ends having straight cut central and end edge portions each extending parallel in uniform spaced relation with the rolled flanged edge, inclined cut edges connecting the straight cut central and end portions of the web, and a separate bar of uniform cross sectional area throughout its length having a flanged edge and an extending web having its edge continuously butt welded to the cut edge of the web of the first mentioned bar and adapted to extend the full length of the sill.

24. A sill for railway cars comprising a rolled bar having a flanged edge and a bellied web with a cut edge having straight central and end portions each extending parallel in uniform spaced relation with the rolled flanged edge, inclined cut edges connecting the straight cut central and end portions of the web, and a separate flanged bar of uniform cross sectional area throughout its length having a web continuously butt welded to the cut edge of the bellied web portion of the first mentioned bar.

25. A sill for railway cars comprising a rolled member of T-section having a flanged top edge and a bellied web portion with an edge having straight central and end portions each extending parallel in uniform spaced relation with the rolled flanged edge, inclined edge portions connecting the straight central and end edge portions of the web, and a separate T-bar of uniform cross sectional area having a flanged edge and a web portion continuously butt welded to the lower edge of the bellied web portion and extending the full length of the sill.

26. A car underframe comprising a pair of spaced I-beams of rolled section forming a center sill extending the full length of the car, a striker and a striking block connecting each end of the pair of spaced I-beams forming the center sill, side sills, body bolsters extending above the center and side sills and cross-ties secured to the center and side sills by welding, a vertically disposed plate having an inwardly disposed flanged lower edge formed integral therewith on each side of the ends of the center sill having their ends welded to the center and side sills adapted to form the end sills for the car underframe, and a channel cover of rolled section over each end of the center sill between each bolster and the striking block and welded thereto adapted to form the car floor over the draft ends of the center sill and disposed with its flanges downwardly and welded to the tops of the center sill I-beams.

27. A car underframe comprising a pair of spaced I-beams of rolled section forming a center sill extending the full length of the car, side sills formed of rolled I-beams, body bolsters extending above the center and side sills, cross-ties secured to the center and side sills by welding, an end sill plate connecting the end of each side sill with the end of the center sill, a cover plate secured to the top of each end sill plate and extending inwardly therefrom, a flange extending from the inner edge of each of the cover plates, and diagonal braces of channel section each having their outer ends butt welded to the flange of the cover plate and the top flange of the side sill and its inner end welded to the bolster and the top flange of the center sill.

28. A car underframe comprising a pair of spaced I-beams forming a center sill extending the full length of the car, a striker block welded to the top of each end of the center sill of the car, side sills, an end sill plate connecting the end of each side sill with the end of the center sill, a cover plate secured to the top of each end sill plate and extending inwardly therefrom, a flange extending from the inner edge of each of the cover plates, body bolsters and cross-ties integrally connected to the center sill, diagonal braces each having its outer end welded to the flange of the cover plate and the outer end of the side sill and the inner end welded to a bolster and the center sill, channel shaped covers over each end of the center sill between the body bolsters and the end sills and disposed with their flanges downwardly and welded to the center sill and their opposite ends welded to the body bolsters and striker blocks, a hand brake and floor supporting plate edge welded to one of the bolsters and a channel cover, and means for connecting the outer end of the hand brake and floor supporting plate to the center and end sill.

ROY A. LEWIS.
CHARLES SCHENCK.